Jan. 9, 1940. L. McCLAIN 2,186,256
WEIGHING SCALE
Filed Dec. 3, 1938
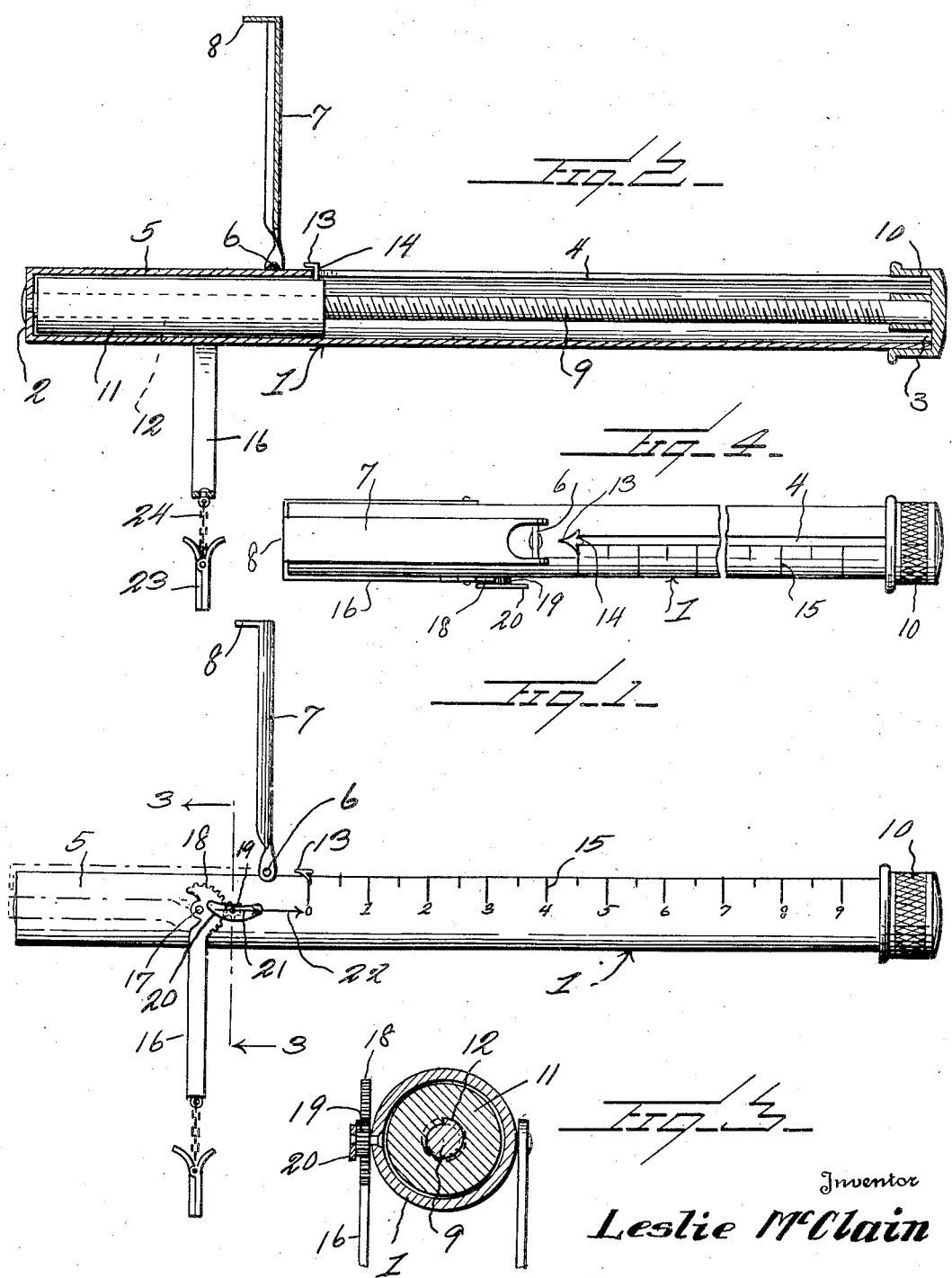
Inventor
Leslie McClain
By Watson E. Coleman
Attorney Patented Jan. 9, 1940

2,186,256

UNITED STATES PATENT OFFICE 2,186,256

WEIGHING SCALE

Leslie McClain, Oklahoma City, Okla.

Application December 3, 1938, Serial No. 243,842

7 Claims. (Cl. 265—49)

This invention relates to improvements in weighing scales and pertains particularly to an improved type of scale designed so that it may be carried conveniently in the pocket.

The present invention has for its primary object to provide an improved vest pocket type of weighing scale which is designed primarily for use in weighing letters or other small objects and has as a novel feature means whereby the several parts may be readily folded in such a manner that the scale will resemble in size and form a fountain pen so that it may be conveniently placed in a vest pocket or other pocket of the clothing and conveniently carried and ready for use when wanted.

Another object of the invention is to provide a pocket scale having a main body portion in the form of an elongated tube or cylinder in which a balance weight is slidably contained and adapted to be shifted in a novel manner for the purpose of balancing the body from a fulcrum or balance point which is disposed between the movable weight and an object carrier which is also attached to the body, the said weight having associated with it a pointer operating in conjunction with a scale extending longitudinally of the body.

Still another object of the invention is to provide in a weighing scale of the above described character, a novel means associated with the object supporting means which is pivotally attached to the body, whereby a determination may be easily made as to when the object is exactly balancing the weight so that the weight of the object can be read upon the weight indicating scale.

The invention will be best understood from a consideration of the following detailed description taken in connection with the accompanying drawing forming part of this specification, with the understanding, however, that this invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the device embodying the present invention, showing the parts in open position for use.

Fig. 2 is a longitudinal sectional view.

Fig. 3 is a view in cross section on the line 3—3 of Fig. 1.

Fig. 4 is a view in top plan showing the graduated scale with the suspension bar folded down.

Referring now more particularly to the drawing, the numeral 1 generally designates the body of the weighing scale embodying the present invention, which body is here shown as being in the form of a tube having a circular or cylindrical exterior cross sectional design. It is to be understood, however, that the invention is not to be limited to the use of a cylindrical tube as shown, but that a tubular body of any other cross sectional form may be made use of if found desirable.

The tubular body 1 is hollow throughout its entire length and one end thereof is closed by the wall 2 while the opposite end is open, as indicated at 3, and formed longitudinally of the wall of the body from the open end 3 through the major portion of the length of the body is a slot 4 in which a pointer member moves as hereinafter described. By terminating the slot 4 short of the opposite end of the tube there is left the unslotted section 5 and secured in a suitable manner transversely of this section 5 at a point adjacent to the inner end of the slot 4, is a pivot or shaft 6 upon which is mounted a suspension arm 7 which is in the form of an elongated plate having a transverse curvature corresponding to the curvature of the portion 5 of the tube against which it is adapted to be positioned when out of use. At the free end of this suspension arm 7 is a laterally extending lip 8 which is adapted to engage over the end wall 2 when the arm is in inoperative position. Thus the arm will be securely held against the body but may be easily and quickly shifted to a position perpendicular thereto when it is desired to use the scale for weighing an object. In such use, the lip 8 then provides a convenient means for suspending the body as a finger of the hand may be engaged under the lip so that the tubular body may be permitted to hang freely from the shaft 6.

Extending longitudinally through the tubular body is a shaft 9 which is in the form of a coarse screw or spiral, the inner end of this screw shaft being suitably rotatably connected to the center of the end wall 2 while the opposite end of the shaft screw carries the head or knob 10 by which it may be conveniently rotated, the knob being suitably formed to engage over the open end 3 of the tube and provide a centering means for the shaft.

Within the tube is an elongated weight body 11 through the center of which a threaded passage 12 is formed for the reception of the shaft screw 9. This body 11, when moved through the tube as far as it can go toward the end wall 2, extends only slightly at one end beyond the inner end of the slot 4. This extended end of the weight body 11 carries a flat pointer 13 which is disposed outside of the tube and extends across the slot 4 and is connected with the weight body 11 by the neck portion 14 which passes from the pointer through the slot to the body.

On the body and extending longitudinally along an edge of the slot 4 is a graduated scale 15 which may be marked to represent ounces or fractions thereof or any other units of weight.

Pivotally suspended from the portion 5 of the tubular body between the suspension arm 7 and the adjacent closed end of the body, is a hanger arm 16. This arm is here shown as being in the form of an elongated U-shaped yoke, the free ends of which have the body of the tube disposed therebetween and the pivotal axis for this yoke, which is indicated at 17, extends transversely of the tube in a line parallel with the shaft 6 but is disposed nearer the closed end of the tube than the shaft. Any suitable means may be employed for pivotally attaching the ends of the arms of the yoke 16 with the body, such for example, as rivets or the like, each of which secures one arm to the adjacent portion of the tube wall. At the upper end of one arm there is formed a gear segment 18 which is concentric with the axis 17 and this gear segment has the teeth thereof meshed with the teeth of a gear pinion 19 which is pivotally attached to the wall of the body on a transversely extending pivotal axis and which carries the elongated plate 20 which is provided with a pointer 21.

The wall of the tubular body 1 has formed thereon a gauge line or arrow 22 which extends longitudinally of the body in line with the pivot centers for the gear and gear segment. When the hanger arm 16 is arranged perpendicular to the tubular body, the pointer 21 will be in perfect alinement with the gauge line 22 and when this occurs, while the scale body is suspended from the end of the suspension arm 7, the scales will be in perfect balance. This perfect balance is obtained when the weight 11 is moved in to the point where the indicator is at zero on the graduated scale and no object is suspended from the hanger 16.

In order that an object such as a letter or the like may be conveniently attached to the hanger 16, there is provided a clip 23 which is attached to the hanger by a short chain 24 or in any other suitable manner. This clip in addition to serving as a means for attaching an object to the scales may also be employed for securing the scales in the pocket while being carried. While the scales are being carried, the hanger arm 16 is swung to a position where it receives between its sides the adjacent end of the tubular body, the closed end portion of the hanger extending across the wall 2 in the manner shown.

In the use of the device, which is believed to be obvious, the suspension arm is swung to the perpendicular relation with the tube in which it is shown and the hanger arm is also swung down in the opposite direction so that when the finger is engaged beneath the lip 8, the tubular body or balance beam, as it then becomes, will be suspended horizontally, assuming that the weight 11 is moved into the tube as far as it will go. The object to be weighed is then attached to the hanger by the clip 23 and this will immediately overbalance the tubular body or beam so that the outer end, that is, the end remote from the hanger 16, will swing upwardly. By then turning the knob 10 and consequently the shaft screw 9, the weight 11 can be shifted within the tubular body or beam until a proper balance is again attained. When such balance is attained, it will be indicated by the rotation of the indicator gear to the position where the lines 21 and 22 assume parallel relations. The weight of the object may then be ascertained by noting the position of the pointer 13 with respect to the graduated scale 15.

It will also be readily apparent that the neck portion 14 of the pointer 13 serves to prevent rotation of the weight body in the tube when the cap 10 is rotated. While the weight body has been illustrated and described as having a threaded passage therethrough, it will be apparent that by extending the neck portion 14 of the pointer into the passage of the weight body, this extended part may be formed for engagement with the spiral or screw and thus eliminate the necessity of threading the bore of the weight.

What is claimed is:

1. A pocket weighing scale of the character described, comprising an elongated body constituting a scale beam, a pointer carrying weight carried by the beam and adapted for movement longitudinally thereof, a graduated scale associated with the beam for cooperation with the pointer of the weight, means for effecting movement of the weight longitudinally of the scale from a zero point toward one end of the beam, means adjacent the said zero point of the graduated scale for suspending the beam, a hanger attached to the beam adjacent to the suspension means and between the same and the end of the beam remote from the graduated scale, said hanger being pivotally attached to the beam, and indicating means connected with and actuated by the hanger for designating when a proper balanced relation is attained between the suspension means, beam and hanger.

2. A weighing scale to be carried in the pocket, comprising an elongated tubular beam body having one end closed, a rotatable cap closing the other end of the body, said body having a wall slot extending from the cap end through the major portion of the length thereof, and the remaining portion of the body being unbroken, a screw extending longitudinally through the tube and connected with said cap for rotation thereby, a weight carried by the screw within the body and adapted to be moved longitudinally thereof, a pointer carried by the weight and extending through the slot for cooperation with a graduated scale on the body, suspension means for the body pivotally attached thereto adjacent the inner end of the slot, a hanger pivotally attached to the body between the suspension means and the end remote from the slot, the hanger means being adapted to have the object to be weighed attached thereto, and indicating means connected to and moved by said hanger for designating when a proper balanced relation is attained between the suspension means, beam and hanger.

3. A weighing scale of the character described, comprising an elongated tubular beam body having one end closed, a rotatable cap closing the other end of the tube body, said body having a wall slot extending from the cap end through the major portion of the length thereof, and the remaining portion of the body being unbroken, a screw extending longitudinally through the tube and connected with said cap for rotation thereby, a weight carried by the screw within the body and adapted to be moved longitudinally thereof, a pointer carried by the weight and extending through the slot for cooperation with a graduated scale on the body, suspension means for the body pivotally attached thereto adjacent the inner end of the slot, hanger means pivotally attached to the body between the suspension means and the end remote from the slot, the hanger means being adapted to have the object to be weighed attached thereto, a rotatable pointer member supported upon the beam body adjacent said hanger, said pointer cooperating with a gauge mark formed upon the beam, and means connected with the hanger and rotatable coaxially therewith and having operative connection with said rotatable pointer means whereby relative oscillation of the hanger and beam will impart rotation to the pointer means for indicating in association with the gauge line when the scale parts are in balance.

4. A pocket weighing scale of the character described, comprising an elongated body constituting a scale beam, a pointer carrying weight carried by the beam and adapted for movement longitudinally thereof, a graduated scale associated with the beam for cooperation with the pointer of the weight, means for effecting movement of the weight longitudinally of the scale from a zero point toward one end of the beam, means adjacent the said zero point of the graduated scale for suspending the beam, a hanger attached to the beam adjacent the suspension means and between the same and the end of the beam remote from the graduated scale, toothed gear means connected with said hanger to be turned coaxially therewith, a gear segment pivotally attached to the body and having toothed connection with said toothed means, a gauge line formed upon the body, and pointer means carried by the gear segment for coaction with said gauge line to designate when the parts of the weighing scale are in balance.

5. A weighing scale of the character described, comprising an elongated hollow body, having one end closed, a cap member rotatably supported upon and closing the other end of the body, the body having a slot in the wall thereof from the cap member through the major portion of the length of the same, said body having a graduated scale extending along an edge of the slot, a shaft rotatably supported in and extending longitudinally of the body and formed to provide a coarse screw, the shaft being connected with the cap for rotation thereby, a weight slidable in the body and having the shaft extending through and in threaded connection therewith, a pointer carried by the weight and extending through the slot for coaction with the graduated scale, an elongated suspension arm pivotally attached to the body at the inner end of the slot and adapted to be folded downwardly and away from the slot against the body, a hanger yoke having two end portions between which the body is pivotally secured, the hanger yoke being disposed between the suspension arm and the end of the body remote from the slot, means coupled with and actuated by the hanger yoke upon oscillation of the same relative to the body which is so constructed and arranged that a balanced condition of the parts when supported from the suspension arm will be indicated, and clasp means carried by said yoke for attaching thereto a body to be weighed, the said yoke being foldable into an inoperative position in which it is parallel with the body.

6. A pocket weighing scale, comprising an elongated body constituting a scale beam and having a passage longitudinally therethrough, a pointer carrying weight carried by the beam and adapted for movement longitudinally therealong, a graduated scale on said body for cooperation with said pointer, a screw extending through and turnable in the passage of the body, said screw being connected with the weight to effect movement of the same longitudinally of the scale from a zero point toward one end of the beam, an arm pivoted to the body adjacent the said zero point for suspending the beam, said arm being formed to fold against the outer side of the body, a hanger attached to the body adjacent the suspension means and between the latter and the end of the body remote from the graduated scale, said hanger being pivotally attached to the body and formed to be folded into a position extending longitudinally of the body, and a balance indicating pointer at the side of the body and directed longitudinally thereof and connected with the hanger to be moved thereby relative to an adjacent fixed mark on the body.

7. A pocket weighing scale comprising an elongated straight body, a pointer carrying weight carried by the body and adapted to be moved longitudinally thereof, a graduated scale extending longitudinally of the body for cooperation with said pointer, means for moving the weight longitudinally of the body, an arm pivotally attached at one end to the outside of the body adjacent a zero point at one end of the scale, said arm being formed to be folded against the side of the body to be disposed perpendicularly thereto for the suspension of the body, an article hanger pivotally attached to the body to oscillate on a transverse axis extending through the longitudinal center of the body, a balance indicating pointer connected with said hanger to be moved thereby and directed longitudinally of the side of the body in the plane of the axis of the hanger, and a fixed marking on the side of the body with which said indicating pointer cooperates to designate a balanced condition between the arm, body and hanger.

LESLIE McCLAIN.